July 18, 1961  E. P. SMITH  2,993,167
CABLE FAULT LOCATOR

Filed Jan. 10, 1958  2 Sheets-Sheet 1

*INVENTOR.*
EDWARD P. SMITH.
BY
Kenneth W Miller
ATTORNEY.

July 18, 1961 E. P. SMITH 2,993,167
CABLE FAULT LOCATOR

Filed Jan. 10, 1958 2 Sheets-Sheet 2

*INVENTOR.*
EDWARD P. SMITH.
BY
Kenneth W. Miller
ATTORNEY.

United States Patent Office 2,993,167
Patented July 18, 1961

2,993,167
CABLE FAULT LOCATOR
Edward P. Smith, Mansfield, Ohio, assignor to The Ohio Brass Company, Mansfield, Ohio, a corporation of New Jersey
Filed Jan. 10, 1958, Ser. No. 708,222
21 Claims. (Cl. 324—52)

This invention relates to testing systems and more particularly to apparatus for locating faults in electric cables.

In many industrial operations it is customary to utilize an arrangement for the distribution of electric power in which a fixed feeder system is maintained to a certain distributing point, and to use a portable electric cable to carry power from the distributing point to the utilization apparatus, e.g., a traveling machine such as a crane, drill, or the like. Particularly in mining operations it is necessary to use such an arrangement because of the constant shifting of the mining apparatus at the face of the mine.

Such arrangements, while advantageous for the intended purpose, suffer certain limitations because of the fact that the cables are prone to develop faults, e.g., either short or open circuits. In mines, for example, a puncture of the cable may lead to a short circuit of the conductors, whereas the twisting and bending of the cable may also produce either short circuits or even cause a severance of the conductors so as to produce an open circuit in the cable.

It is known to provide circuit protection apparatus so that on the occurrence of a short or open circuit in the cable, the primary circuits will be opened to prevent damage either to the supply or utilization apparatus. However, before the utilization apparatus can again be made operative, it is necessary that the location and nature of the fault in the cable be determined and the cable either repaired or replaced. Heretofore, this has been a difficult matter, usually necessitating extended periods of shutdown.

Various types of electric cable fault locators have been proposed and have been successfully utilized, particularly in connection with communication cables and networks. However, a number of circumstances have mitigated against the adoption of such fault locators in mines. The equipment must possess an inherent ruggedness so as to withstand the physical conditions prevalent in mines, and secondly, the available equipments have heretofore been designed in such a way that the cost of the device is prohibitive for such purposes. Further, a desirable fault locator must be simple in operation and not require precise adjustments.

I have advised and constructed a novel fault locator suitable for use under the conditions above referred to. As disclosed and described herein, I have made certain improvements in cable fault locators, for use particularly in connection with power cables.

According to the invention, I have devised a receiver in which a simplified pickup device is utilized for detecting the electric and magnetic fields about a cable. This pickup is constituted in one form by a step-down transformer in which the primary is connected to the core and is used as an electric pickup for determining the intensity of the electric field about the cable and thereby to determine the location of an open circuit at any point along the cable. Similarly, the secondary is used as a magnetic pickup for determining and locating the presence of a short circuit at any point along the cable.

By the embodiment of such a pickup arrangement, together with a miniature transistor amplifier, I am able to incorporate the entire receiver in a small tubular housing requiring only the attachment of earphones for use. Moreover, I am thereby able to fill the housing with an impregnating or potting compound so as to produce a receiving unit which has a ruggedness greatly exceeding any heretofore available and which, with its compactness, renders the device useful under adverse industrial conditions.

The receiver described above is adapted for use with any of a variety of transmitters, so-called, or signal generators to constitute a complete fault locator. However, I have devised a new signal generator embodying a new mode of operation which, when utilized with the receiver described above, permits the practice of a new and improved method for locating faults in cables.

As hereinafter described, the novel signal generator is operable to alternately excite the cable first to generate electric fields about the conductor, if the fault is an open circuit, and then to excite the cable to generate a magnetic field about the conductors if the fault is a short circuit. This alternate excitation in different modes is accomplished at an audible rate so that the fields may be detected by a simple receiver of the type described above. More particularly, a mechanical vibrator is utilized to alternately connect a battery first to a step-up transformer for generating high voltage impulses and then directly to the cable for producing current impulses in the cable.

Accordingly, it is the principal object of the invention to provide a cable fault locator of greatly simplified construction. Another object of the invention is to increase the ruggedness and stability and to increase the life of the cable fault locators.

The invention, together with further objects, features and advantages thereof, will be evident from the following specification and claims, taken in connection with the appended drawings, in which FIG. 1 is a schematic diagram illustrating the mode of employment of the apparatus of the invention;

Figure 1:
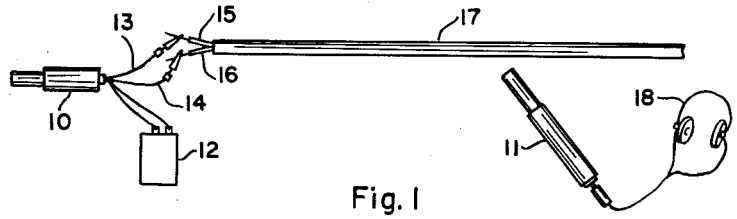

Referring now to FIG. 1, the cable fault locator of the invention includes two compact portable units including a signal generator 10 and a receiver 11. The signal generator 10 is energized by a means such as a battery 12 and is connected by means of two leads 13 and 14 to the conductors 15 and 16 of the cable 17 to be tested. The receiver 11 is carried along the cable and an indication of a fault, such as a short circuit between the conductors 15 and 16 or an open circuit in one of those conductors, is provided by certain sounds in the earphones 18 which are connected to the receiver 11 and which are worn by the operator.

The signal generator 10 energizes the cable 17 in a periodic manner so as to produce electric and magnetic fields about the conductors which are detectable by the receiver 11. The receiver 11 produces a definite signal corresponding to the field and certain changes in the signal as the receiver is moved along the cable may be attributed to a discontinuity either in the conductors of the cable or in their relation one to the other.

Figure 2:
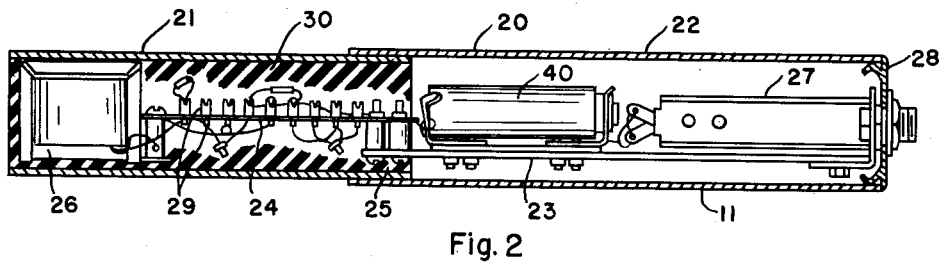
FIG. 2 is a vertical sectional view of the receiver of the cable fault locator of the invention.

As is shown in FIG. 2, the receiver 11 comprises a tubular housing 20 constituted by a piece 21 of insulating material and a metallic piece 22 fitted coaxially over the piece 21 at one end thereof. The housing 20 supports and is supported by a chassis assembly which includes two flat members or strips 23 and 24 which are held together in vertically spaced relationship by two bolts 25. The strip 24, also designated as the amplifier strip, is similarly secured to a transformer 26 which fits tightly within the tubular member 21. A jack 27 is mounted upon the strip 23, also designated as the jack strip, and has the neck thereof received through an opening in a clip plate 28 and is secured thereto by a nut so that the entire assembly is held in a fixed relation.

The amplifier strip 24 carries the various electrical elements of the amplifier, resistors, condensers, and transistors, mounted upon binding posts 29. The member 21 is filled with a resinous potting compound, indicated generally at 30, to produce a solid and rigid element which is capable of withstanding any shock to which the receiver might be subjected in the course of use and to protect the elements of the apparatus.

The transformer 26 is arranged so as to constitute a combined electric and magnetic field pickup for the receiver.

Figure 3:
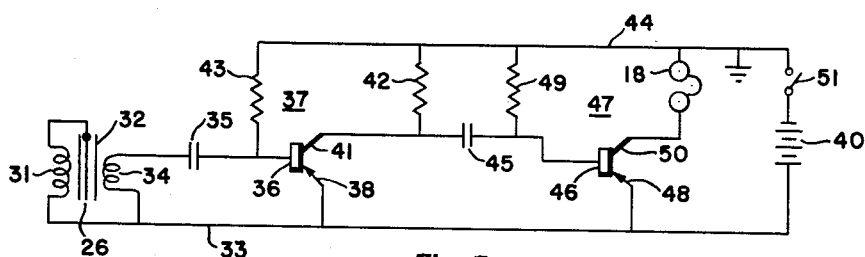
FIG. 3 is a circuit diagram of the receiver of FIG. 2.

Referring to FIG. 3, the transformer 26 has the primary 31 thereof connected at one end to the core 32 which serves as the electric pickup element. The remaining terminal of the primary is connected to the common lead 33.

The secondary 34 of the transformer 26 functions as a magnetic pickup element and has one terminal connected to the common lead 33 and the remaining terminal connected through a series capacitor 35 to the base 36 of a transistor 37.

It will be seen that the transformer 26 will, when placed in a position adjacent a suitable energized conductor, impart electrical impulses to the base of the transistor 37 because of the coupling of the coil 34 with the magnetic component of the field about the conductor and will similarly impart electrical impulses to the base of the transistor by reason of the coupling of the core 32 with the electric component of the field about the conductor.

The transistor 37 has the emitter 38 thereof connected to the common lead 33 which is in turn connected to the positive pole of the battery 40. The collector 41 and the base 36 of the transistor are connected through the resistors 42 and 43 respectively and the lead 44 to the negative pole of the battery 40. The transistor 37 thus constitutes, with its associated elements, a first amplifying stage for impulses received from the transformer 26.

The output of the transistor 37 is coupled through a capacitor 45 to the base 46 of a second transistor 47 which constitutes a second amplifying stage. The emitter 48 of the transistor 47 is connected to the common positive lead 33, while the base 46 is connected through the resistor 49 to the common negative lead 44. The collector 50 is connected through the earphones 18 to the negative lead 44 which is grounded to the housing piece 22 through the frame of the jack 27. This connection effectively places the common lead 33 at the same potential with respect to the cable ground when the switch 51 is closed and the lead 33 may be connected to the piece 22 in equivalent constructions.

The several capacitors 35 and 45, resistors 42, 43 and 49, and transistors 37 and 47 are mounted upon the lugs 29 and are embedded in the potting compound. All the connections between the aforementioned elements and the transformer 26 are permanently incorporated in the body of potting compound. The battery 40 is of known design and is carried upon the member 23 by means of a suitable clip. The connections from the battery 40 and the jack 27 to the amplifier strip and transformer are suitably made by flexible leads and the jack 27 incorporates a switch 51 so that the amplifier is energized only when the plug of the earphones is inserted in the jack.

Figure 4:
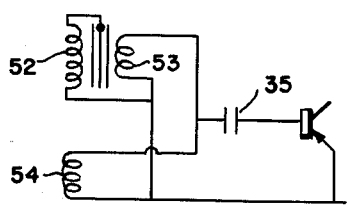
FIG. 4 is a circuit diagram illustrating an alternative embodiment of the receiver.

According to the embodiment of the invention of FIG. 4, the transformer 52 is connected in the same manner as the transformer 26 of FIGS. 2 and 3. The secondary 53 is, however, not utilized as a magnetic pickup element, that function being performed by a separate coil 54. The secondary 53 of the transformer 52 and the coil 54 are, however, connected in parallel so that impulses from the transformer 52 and the coil 54 are both impressed upon the base of the transistor 37. The core of the transformer 52 acts as an electric pickup device, while the transformer windings produce an impedance match between the core of the transformer and the base circuit of the transistor. The magnetic pickup coil 54 may, of course, be wound to an impedance which is reasonably close to the required optimum impedance for the transistor circuit.

Figure 5:
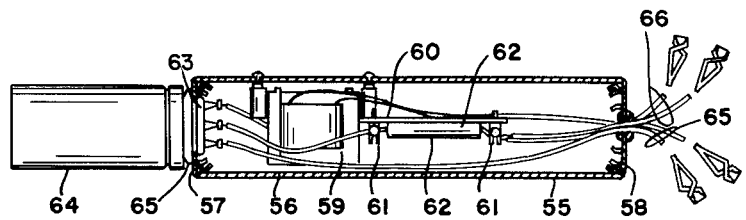
FIG. 5 is a vertical sectional view of the signal generator of the cable fault locator of the invention.

Referring now to FIG. 5, the mechanical arrangement of the signal generator 10 is there shown. The signal generator includes a cylindrical housing 55 constituted by a tubular metallic piece 56, a fixed end plate 57 at one end of the piece, and a spring plate 58 at the remaining end of the piece. A transformer 59 is mounted within the piece 56 and supports a wiring strip 60 of insulating material which carries soldering lugs 61 and suitable resistors, indicated at 62. The end plate 57 carries a socket 63 in which a vibrator 64 of known design is supported. Two battery leads 65 and two test leads 66 are provided with spring clips for connecting the signal generator to the energizing source and to the conductors of the cable under test respectively. Suitable wiring connections are made between the prongs of the socket 63, transformer 59, resistor 62, and the leads 65 and 66 in accordance with the schematic diagrams set forth in FIGS. 6 and 7.

Figure 6:
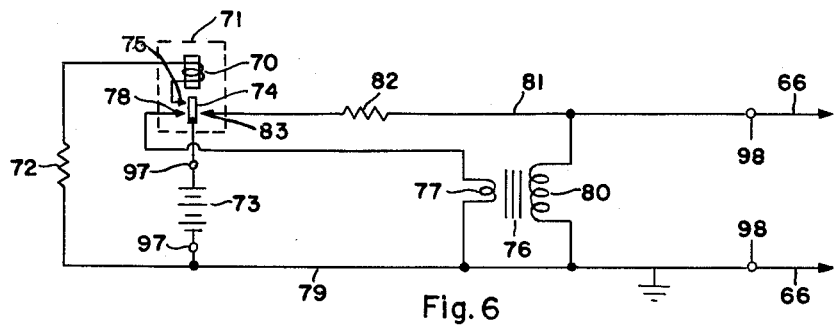
FIG. 6 is a circuit diagram of the signal generator of FIG. 5.
Figure 7:
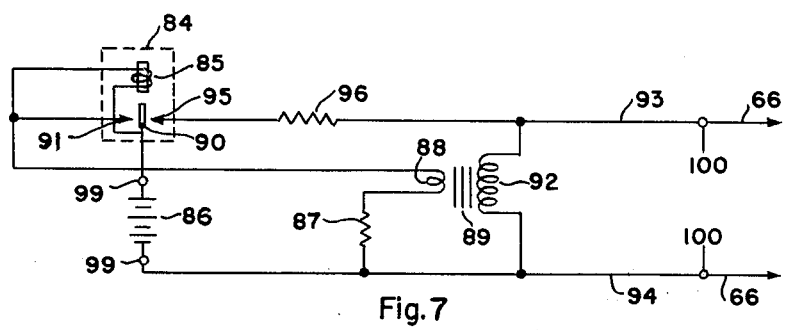
FIG. 7 shows an alternate circuit arrangement useful in the signal generator of FIG. 5.

In each of the arrangements of FIGS. 6 and 7, a mechanical vibrator is employed to alternately energize the conductors 15 and 16 of the cable 17, first as though the fault along the cable were a short circuit between those conductors on one swing of the vibrator armature and on the succeeding or return swing of the armature as though the fault were an open in one of the conductors. In the former instance the cable appears to the generator as a relatively low impedance so that relatively large currents at relatively low voltages produce a magnetic field about the shorted conductors. In the second instance, the cable appears to the generator as a high impedance so that a relatively high voltage at a low current is required to produce an electric field about the connected part of the open conductor and the remaining conductor. In each instance the field may be sensed by the receiver 11.

The arrangement of FIG. 6 employs a so-called series drive vibrator in which the drive coil of the vibrator is connected to the battery or energizing source only during one portion of the movement of the armature so as to produce the driving impulses for maintaining the oscillating movement of the vibrator armature. This is shown in FIG. 6, wherein the drive coil 70 of the vibrator 71 is connected in a series circuit which includes a protective resistor 72, a battery 73, the armature 74, and an auxiliary drive contact 75. The coil 70 is thus energized when the armature 74 is in its center position and the left half of its cycle. The rate of vibration of the armature 74 may be such that the impulses produced are within the audible range, for example, about 120 cycles per second for commercial vibrators.

The transformer 76 has a primary 77 connected in series between the main contact 78 and a common lead 79 which is connected to one of the test leads 66. The secondary 80 is connected to the common lead 79 and to a second common lead 81 which is in turn connected to the remaining one of the test leads 66. The lead 81 is connected through a resistor 82 to the remaining main contact 83 of the vibrator 71.

With this arrangement, the leftward movement of the armature 74 closes the circuit which includes the contact 78, the primary 77 of the transformer 76, and the battery 73. The transformer primary is thus energized with a generally rectangular wave of direct current for the interval during which the contact 78 is closed to produce relatively high voltage impulses across the secondary as the circuit is closed and opened. These impulses are impressed upon the two conductors 15 and 16 so as to produce an electric field about the conductors during one-half of the cycle of movement of the armature of the vibrator if the fault is an open circuit.

The succeeding movement of the armature 74 causes the armature to engage the main contact 83 and thereby close the circuit which includes the lead 81 and the resistor 82, and the armature 74, the battery 73, and the lead 79. The conductors 15 and 16 of the cable are thus energized with a relatively high current impulse so as to produce a magnetic field during the right one-half of the cycle of movement of the armature of the vibrator if the cable fault is a short circuit between those conductors. The resistor 82 is a current limiting resistor and prevents excessive drains upon the battery 73 and excessive erosion of the contact 83 where the reistance of the cable is low.

The arrangement of FIG. 7 employs a so-called shunt drive vibrator in which the drive coil of the vibrator is continuously connected to the battery or energizing source and is short circuited during one-half of the cycle of movement of the vibrator for producing the necessary drive impulses of the armature. This is shown in FIG. 7, wherein the drive coil 85 of the vibrator 84 is connected in a series circuit which includes the battery 86, limiting resistor 87, and the primary 88 of the transformer 89. The drive coil 85, as well as the primary 88 of the transformer 89, are thus in an energized condition when the battery circuit is closed.

Upon leftward movement of the armature 90, the contact 91 is engaged, thus short circuiting the drive coil 85 to allow the armature to reverse its direction of movement and simultaneously produce a generally rectangular wave of increasing current through the primary of the transformer. High voltage impulses are thus produced across the secondary 92 of the transformer 89 and impressed through the leads 93, 94 and 66 upon the conductors 15 and 16 as the contacts across the drive coil are closed and opened. Thus, an electric field is produced about the conductors of the cable during the left one-half of the cycle of movement of the armature of the vibrator if the fault of the cable is an open circuit in one of the conductors.

The succeeding movement of the armature 90 causes the armature to engage the contact 95 and thereby close the circuit which includes the resistor 96 and the lead 93, the battery 86, and lead 94 and the leads 66. The conductors 15 and 16 of the cable are thus energized with a relatively high current impulse during the right one-half of the cycle of movement of the armature of the vibrator so as to produce a magnetic field if the cable fault is a short circuit between the two conductors.

The schematic representations of FIGS. 6 and 7 correspond to the showing of FIG. 5. Thus the vibrators 71 and 84 of FIGS. 6 and 7 correspond to the vibrator 64 of FIG. 5 and the transformers 76 and 89 of FIGS. 6 and 7 correspond to the transformer 59 of FIG. 5.

For the purposes of description and claiming, the signal generator is said to have two battery terminals designated by the numerals 97 and 99, and two test terminals designated by the numerals 98 and 100 in FIGS. 6 and 7 respectively. This terminology is adopted only because the device of FIG. 5 is ordinarily utilized with separate battery and cable circuits and is not to be taken as a substantive limitation in any respect.

It is to be understood that with the signal generator arrangements of FIGS. 6 and 7 the operation of the transmitter is such that for a given type of fault only one type of field of sufficient intensity to actuate the receiver herein is ordinarily produced. Thus, if the cable fault is a short circuit, only a magnetic field will be produced along the conductor by reason of the current impulses produced during the right portion of the cycle of movement of the vibrator; conversely, where the cable fault is an open circuit, in one or both of the conductors, then high potential impulses will be produced because of the high voltage impulses impressed upon the conductors during the leftward movement of the armature of the vibrator.

Under certain circumstances, such as for relatively large distances from the point of the signal generator to the fault, both effects might be present and it is intended that such utilization and operation of the apparatus be covered by the claims set forth herein. However, under ordinary circumstances, and particularly for the testing of electric power cables, the former mode of operation ordinarily takes place. It is a great advantage of the invention that no preliminary determination of the qualitative nature of the fault is necessary and that the location of the faults may be accomplished with relatively simple apparatus and by relatively unskilled personnel.

In operation the signal generator is connected as shown in FIG. 1, the battery 12 corresponding to the battery 73 or the battery 86 of the schematic diagrams of FIGS. 6 and 7 respectively. The test leads 66 are connected to the conductors 15 and 16 of the cable 17. With the earphones in place, the receiver 11 is moved into a position adjacent the cable 17 until a characteristic buzzing noise, corresponding to the rate of vibration of the vibrator is heard in the phones. The receiver is then moved along the cable until a characteristic signal is modified so as to indicate the existence of a fault in the cable.

The nature of the modifications of the signal in the receiver, which are incurred as the receiver is moved along the cable, depends on the physical characteristics of the cable as well as on the nature of the fault. Thus, where the cable conductors are twisted, periodic cancellations or substantial diminutions of the field, which are detected as the receiver is moved along the cable, are due to the periodic changes in orientation of the two conductors with respect to the pickup device. In such a cable a short circuit will result in a signal such that strong phase cancellations are heard as the receiver is moved between the transmitter and the short circuit. When the receiver moves beyond the short circuit the phase cancellations do not occur, and a relatively steady tone is detected which dies out rapidly as the receiver is moved beyond the short circuit. For open circuits in cables having twisted conductors, two different types of effects will be produced, depending upon the relative positioning of the receiver with respect to the cable. If the pickup device is very close to the cable, moderate cancellation effects are noted as the receiver is moved along the cable until the point of open circuit is reached. Beyond the open circuit the signal is steady and somewhat stronger than along the portion of the cable between the signal generator and the open circuit. If the pickup device is positioned somewhat further away from the cable, only a steady tone will be heard as the receiver is moved along the cable between the signal generator and the point of open circuit. A sharp cancellation of the signal occurs at the open circuit and a steady and somewhat stronger tone is detected beyond the opening. In each instance the signal beyond the fault point is attributable to ground effects.

When the conductors are not twisted, the cancellation effects are, of course, not present and the change in signal intensity at the fault must be relied upon to locate the fault.

The receiver 11 is, of course, useful with the signal generators of the prior art or, by modification of the signal generator of FIG. 5, to practice the methods of the prior art. The latter might be accomplished by continually exciting the cable as though the fault were a short circuit, or continually exciting the cable as though the fault were an open circuit. Thus, both fixed conductors of the vibrator might be connected to the test lead or to the primary of the transformer to produce impulses at a repetition rate twice that of FIGS. 6 and 7 in each instance.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. That method of determining faults in a cable wherein the distance of a fault from an accessible point of the cable conductors is unknown, which comprises alternately energizing the conductors first as though the conductors were short circuited to produce predominately magnetic fields along the conductors, and then as though the conductors were open circuited to produce predominately electric fields along the conductors, and locating the fault by detecting the field actually excited about the conductors along the cable.

2. That method of determining faults in a cable wherein the distance of a fault from an accessible point of the cable conductors and the character of the fault are unknown, which comprises alternately energizing the conductors as though the conductors were short circuited to produce current impulses in the conductors and predominately magnetic fields about the conductors if the conductors are short circuited and then as though the conductors were open circuited to produce voltage impulses along and predominately electric fields about the conductors and in the region of the fault if the conductors are open circuited at a periodic rate in the audible range, and locating the fault by detecting the field component actually excited about the conductors along the cable.

3. That method of determining faults in a cable wherein the distance of a fault from an accessible point of the cable conductors and the character of the fault are unknown, which comprises alternately energizing the conductors as though the conductors were short circuited to generate current impulses therein and then as though the conductors were open circuited to generate voltage impulses therein and continuing such alternate energization at a periodic rate in the audible range, and moving a sensing device capable of simultaneously detecting electric and magnetic fields about the cable conductors along the cable.

4. In combination, a cable having at least two conductors for transmitting electrical energy, with an open or a short-circuit between the said conductors at an unknown distance along the cable from an accessible part thereof, a signal generator connected to the conductors of the cable at the said accessible part thereof comprising means for applying a voltage to the said conductors, means for applying a current to the said conductors and oscillator means for operatively energizing the said cable alternately first by one of the said means and then the other at a periodic rate within the audible range, the said voltage means producing electric fields about the conductors if the conductor portions are open-circuited and the said current means producing magnetic fields about the conductors if the said conductors are short-circuited, and a receiver having a combined pickup and sensing device in field-coupled relationship with the conductors of the cable on the exterior of the cable for movement along the cable, the said device being simultaneously responsive to varying electric and magnetic fields for generating audible signals indicative of either the said electric or magnetic fields about the said conductors.

5. In combination a cable having two spaced electrical conductors, a signal generator connected to the conductors of the cable, said signal generator including a battery, means for periodically connecting the battery to the conductors of the cable and interrupting the connection at an audible rate for producing a time varying magnetic field along the conductors of the cable if the conductors are short circuited, means for generating high voltage impulses including a transformer, and means periodically connecting the battery to and disconnecting the battery from the primary of the transformer, all for producing an electric field along the conductor of the cable if one of the conductors is open circuited, and a receiver for detecting electric and magnetic fields and adapted to be moved along the cable, the said receiver having a combined pickup and sensing device for simultaneously detecting electric and magnetic fields according to the nature of the fault in the cable.

6. In combination a cable having two spaced electrical conductors, a signal generator having leads connected to the conductors of the cable and a battery, the said signal generator including a transformer having the secondary thereof connected to the leads, and means for alternately connecting the battery first to the cable and then to the primary of the transformer and thereby intermittently energizing the cable with current impulses from the battery to produce magnetic fields about the conductors if the cable has a short circuit between the conductors and intermittently energizing the cable with high voltage impulses from the transformer to produce electric fields about the conductors if one of the conductors is open circuited, and a receiver comprising electric and magnetic pickup devices, an amplifier and reproducing means for relative movement with respect to the cable to simultaneously sense the electric and magnetic fields about the conductors produced by the signal generator and thereby enable determination of the position of the fault along the cable by reason of changes in the fields due to open or short-circuited conductor portions.

7. In combination a cable having two spaced electrical conductors, a signal generator having leads connected to the conductors of the cable and a battery, the said signal generator including a transformer having the secondary thereof connected to the leads, and a vibrator for alternately connecting the battery first to the cable and then to the primary of the transformer at a periodic rate in the audio frequency range and thereby intermittently energizing the cable with current impulses from the battery if the cable has a short circuit between the conductors and intermittently energizing the cable with high voltage impulses from the transformer if at least one of the conductors of the cable is open circuited, and a receiver comprising electric and magnetic pickup devices, an amplifier and reproducing means for relative movement with respect to the cable to sense the fields about the conductors produced by the signal generator and to produce an audible tone indicative of the strength of the field produced about the said conductors.

8. For use with a cable having two spaced electrical conductors accessible at some point along the cable and faulted at some other point along the cable in combination, a signal generator having two leads for connection to the conductors of the cable at the accessible point and a battery, the said signal generator including a transformer having the secondary thereof connected to the leads, and a vibrator for alternately connecting the battery first to the cable and then to the primary of the transformer and thereby intermittently energizing the cable with current impulses from the battery if the cable has a short circuit between the conductors and intermittently energizing the cable with high voltage impulses from the transformer if at least one of the conductors of the cable is open circuited, and a receiver comprising electric and magnetic pickup devices, an amplifier and reproducing means, all for movement along the cable to sense the fields about the conductors produced by the signal generator and thereby enable determination of the position of the fault along the cable by reason of changes in the fields due to open or short-circuited conductor portions in the cable.

9. For use with a cable having two spaced electrical conductors accessible at some point along the cable and faulted at some other point along the cable in combination, a signal generator having two leads for connection to the conductors of the cable at the accessible point and a battery, the said signal generator including a transformer having the secondary thereof connected to the leads, and a vibrator for alternately connecting the battery first to the cable and then to the primary of the transformer at a periodic audible rate and thereby intermittently energizing the cable with current impulses from the battery if the cable has a short circuit between the conductors and intermittently energizing the cable with high voltage impulses from the transformer if at least one of the conductors of the cable is open circuited, and a receiver comprising electric and magnetic pickup devices, an amplifier and reproducing means, all for movement along the cable to sense the fields about the conductors produced by the signal generator and to produce an audible indication of the strength of the field produced about the said conductors.

10. A signal generator for a cable fault locator comprising a vibrator having an armature and two fixed contacts and a drive coil, two battery terminals for connection to a battery, a transformer and two test leads, connections from the secondary of the transformer to the said two test leads, a series circuit including a first one of the said fixed contacts, the primary of the transformer, the battery terminals and the armature, for energizing and de-energizing the primary of the transformer when the said one fixed contact is engaged and dis-engaged by the armature to generate high voltage impulses at the test leads during one part of the movement of the armature, a series circuit including the remaining one of the said fixed contacts, the armature and the battery terminal connected to the two test leads for connecting and disconnecting the battery to the test leads during the remaining part of the movement of the armature and thereby producing current impulses in the test leads when connected to an external closed circuit, circuit means including the drive coil and the armature for periodically energizing the drive coil to cause the armature to vibrate and alternately engage the fixed contacts.

11. The invention in accordance with claim 10 including a current limiting resistor in the last named circuit between the battery for limiting the current flow in the external circuit when the armature engages the said remaining one of the said fixed contacts.

12. The invention in accordance with claim 10 and including a current limiting resistor connected between the primary of the transformer and the battery for limiting the current flow from the battery to the transformer when the armature is engaged with the said one of the fixed contacts.

13. The invention in accordance with claim 10 in which the armature vibrates at a frequency in the audible range.

14. A signal generator for a cable fault locator comprising an elongated cylindrical housing, a socket in an end piece at one end of the housing and a vibrator received therein, a step-up transformer within the housing, two battery terminals for connection to an energizing source, two test terminals and means for connecting the test terminals to a cable to be tested, a series electrical circuit including an armature, a drive coil and a fixed contact of the said vibrator, the battery terminals and the primary of the said transformer, a shunt circuit including the secondary of the said transformer of the test terminals, a second series electrical circuit including the armature and a second fixed contact of the said vibrator, the battery terminals and the test terminals and a drive circuit for the said vibrator comprising a circuit including a drive coil in the vibrator, the armature and a contact and connection between the drive coil contact armature and battery terminals, said transmitter being adapted to alternately energize an external circuit with alternate current and voltage impulses.

15. A signal generator for a cable fault locator constituted by a cylindrical metal housing, a socket at one end of the housing and a vibrator received in the socket, a transformer and at least one resistor within the housing and two pairs of leads extending from the remaining end of the housing including one pair for connection to an energized device and a remaining pair for connection to the conductors of the cable under test and electrical connections between the said vibrator, the said transformer and the said resistor to constitute a series circuit including an armature and a contact of the vibrator and the test leads, a series circuit including the armature and a contact of the vibrator and the primary of the transformer and a circuit including the secondary of the transformer and the test leads.

16. A receiver for a cable fault locator comprising a pickup device constituted by a step-down transformer having the primary thereof connected to the core of the transformer to constitute an electric pickup and the secondary thereof constituting a magnetic pickup and an impedance transforming means for the said electric pickup, an audio-amplifier connected to the secondary of the said transformer and to the remaining terminal of the primary thereof and a reproducing device connected to the output of the said amplifier, all for detecting fields in the vicinity of a cable circuit having characteristic frequencies in the audible frequency range.

17. The invention in accordance with claim 16 in which a magnetic pickup coil is connected in parallel with the secondary of the said transformer and the said secondary serves only as an impedance matching device for the electric pickup.

18. Electrical apparatus constituting a portable electrical receiver adapted for hand carrying during use comprising a housing in two coaxial cylindrical parts, a first cylindrical part supporting a pickup device at one end thereof, means supported in the said first part of the housing and carrying resistors, condensers and transistors to constitute an amplifier connected to the said pickup device, a jack strip supported by the amplifier strip a resin impregnating compound filling the said first housing for protecting the amplifiers means, terminal means and energizing means for the said amplifier supported at the remaining end of the said first part, and the second cylindrical part extending along and about the said terminal and energizing means and means detachably securing the said second part to the said first part.

19. Electrical apparatus constituting a portable electrical receiver adapted for hand carrying during use comprising a housing in two coaxial cylindrical parts, a first cylindrical part of insulating material and, supported therein, a pickup device comprising a step-down transformer with the primary thereof connected to the core to constitute an electric pickup and the secondary thereof constituting a magnetic pickup and an impedance matching device for the electric pickup mounted at one end of the said first part, means in the said first part of the housing and carrying thereon resistors, condensers and transistors to constitute an amplifier connected to the said pickup device, a rigid piece supported at the adjacent end thereof and extending outward from the remaining end of the said first part, and terminal means mounted on the said rigid piece, a resin impregnating compound filling the said first part, and a second cylindrical part detachably supported by the said first part and extending along and about the rigid piece and terminal means.

20. A receiver for a cable fault locator comprising a housing in two coaxial cylindrical parts, a first cylindrical part of insulating material and supported therein a pickup device, an amplifier, strips supported in the said first part of the housing and carrying thereon resistors, condensers and transistors to constitute an amplifier connected to the said pickup device, a common lead for the said pickup device and the said amplifier, a jack strip supported by the amplifier strip at the adjacent end thereof and extending outwardly from the said first housing part, a jack and a battery clip mounted on the said jack strip and connected to the amplifier, a resin impregnating compound filling the said first housing part and a second cylindrical housing part of metal detachably supported by the jack strip and extending along and about the jack strip and over the first housing part and a circuit from the said common lead to the second housing part for capacitively grounding the said common lead.

21. That method of determining faults in a cable wherein the distance of the fault from an accessible point of the cable and the character of the fault are unknown, which comprises alternately energizing the conductors first as though the conductors were short circuited and then as though the conductors were open circuited and continuing such alternate energization at a periodic rate, sensing the field about the cable to ascertain the character of the field actually produced about the conductors and thereby ascertaining the character of the fault and locating the fault by detecting changes in the said actual field along the conductors.

References Cited in the file of this patent

UNITED STATES PATENTS

| | | |
|---|---|---|
| 1,401,586 | Comstock | Dec. 27, 1921 |
| 2,249,166 | Parker et al. | July 15, 1941 |
| 2,586,781 | Brownlow | Feb. 26, 1952 |
| 2,698,921 | Wharton | Jan. 4, 1955 |
| 2,766,427 | Brownlow | Oct. 9, 1956 |